United States Patent
Oddsen, Jr. et al.

(10) Patent No.: US 7,222,831 B2
(45) Date of Patent: May 29, 2007

(54) ADJUSTABLE DISPLAY ARM FOR ELECTRONIC COMPONENTS

(75) Inventors: Odd N. Oddsen, Jr., Easton, PA (US); Howard M. Williams, Jr., Emmaus, PA (US)

(73) Assignee: Innovative Office Products, Inc., Easton, PA (US)

( * ) Notice: Subject to any disclaimer, the term of this patent is extended or adjusted under 35 U.S.C. 154(b) by 167 days.

(21) Appl. No.: 10/892,798

(22) Filed: Jul. 16, 2004

(65) Prior Publication Data

US 2005/0061931 A1   Mar. 24, 2005

Related U.S. Application Data

(60) Provisional application No. 60/487,999, filed on Jul. 17, 2003.

(51) Int. Cl.
*A47H 1/00* (2006.01)

(52) U.S. Cl. ........................ 248/327; 248/917

(58) Field of Classification Search .......... 248/333, 248/317, 323, 325, 326, 327, 331, 123.11, 248/125.1, 125.2, 125.8, 279.1, 917, 918
See application file for complete search history.

(56) References Cited

U.S. PATENT DOCUMENTS 3,539,142 A * 11/1970 Morand .................. 248/230.2
4,964,606 A * 10/1990 Beam et al. ............. 248/333
5,127,617 A    7/1992 Bergetz
5,797,568 A    8/1998 Canton Gongora et al.
5,873,556 A *  2/1999 Reiker .................... 248/323
6,073,892 A *  6/2000 Dittmer ................... 248/157
6,152,426 A * 11/2000 Von Fange ............... 254/334
6,783,105 B2   8/2004 Oddsen, Jr.
2003/0116687 A1* 6/2003 Oddsen, Jr. ............ 248/279.1
2005/0139742 A1* 6/2005 Frisell ...................... 248/317

* cited by examiner

*Primary Examiner*—Ramon O Ramirez
(74) *Attorney, Agent, or Firm*—Lerner, David, Littenberg, Krumholz & Mentlik, LLP (57) ABSTRACT

A display arm having an elongated outer housing, an elongated inner housing telescopically engaged within the outer housing, a biasing member coupled with the outer housing and operative to counter-balance the inner housing within the outer housing, and a locking mechanism for locking the position of the inner housing relative to the outer housing. The locking mechanism may include a first locking vane and a second locking vane, each locking vane having a sloped surface abutting an edge of the inner housing and a second surface abutting an interior surface of the outer housing, wherein the sloped surfaces initiate spreading of the locking vanes when the locking vanes are pulled into an extended position by the locking mechanism such that the second surfaces engage the interior surface of the outer housing with sufficient force to prevent movement of the inner housing relative to the outer housing.

20 Claims, 4 Drawing Sheets

ADJUSTABLE DISPLAY ARM FOR ELECTRONIC COMPONENTS

CROSS REFERENCE TO RELATED APPLICATIONS

This application claims the benefit of the filing date of U.S. Provisional Patent Application Ser. No. 60/487,999 filed Jul. 17, 2003, the disclosure of which is hereby incorporated herein by reference as if fully set forth herein.

BACKGROUND OF THE INVENTION

The present invention relates in general to the field of display arms, and more particularly, to adjustable display arms for devices such as electronic components including computer monitors, keyboards, televisions, and the like.

There are many different devices relating to display arms for electronic components, such as those related to computers. Many times, these devices are employed in order to conserve space. Rather than placing such components directly on a desk, table, or other supporting surface, display arms are used to keep the components elevated from the surface. These display arms are generally attached to the surface or an adjacent surface and may be fixed in one or more positions by anchors or the like. These devices can save desktop space, but still render an otherwise vacant area occupied with the electronic components, as well as the display arm.

In many instances, there is not a surface but rather a wide-open area for which to conserve space, or in which to use a display arm. For example, a generally unemployed area within a given space is that above head-level. Storage devices that utilize this area allow for components to be stored out of the way to conserve floor space or other space, which can be populated by other materials. Televisions that utilize a remote control are perfect examples of something that can be stored in this fashion. Sporadically used computer components are another. U.S. Pat. No. 5,127,617 to Bergetz teaches a swivel mounting device for televisions and the like. This device allows for a television to be supported from the ceiling, but does not allow for the television to be adjusted in the vertical direction. While this will still allow for the use of a television through a remote control, computer components and other hands-on devices are not appropriate for use with this device.

U.S. Pat. No. 5,797,568 to Canton Gongora et al. and U.S. Pat. No. 4,964,606 to Beam et al. allow for vertical adjustment in a monitor-supporting device. However, this adjustment can only be achieved in fixed increments. In order to perform the vertical adjustment as taught in these patents, the weight of the components must constantly be supported, an anchoring device must be removed, the components must be raised or lowered into position, and the anchoring device must be replaced. Depending on the weight of the component and the height above the surface, this procedure may require two or more persons and is often quite difficult and time consuming.

The present invention is directed to a display arm that may be raised and lowered with minimal exertion while supporting an electronic component. The display arm of the present invention allows computer components and the like, that may be used intermittently, to be stored at an elevated level while being easily adapted to be moved to a lower level for ease of use or viewing. Relocation from an upper level to a lower level, and vice-versa, may be achieved quickly and efficiently with minimal effort. Relocation may also be achieved through an infinite range of adjustment intervals, rather than at preset fixed intervals.

SUMMARY OF THE INVENTION

In accordance with one aspect of the present invention, an adjustable display arm for positioning a device in a plurality of positions is disclosed. The display arm may comprise an elongated outer housing, an elongated inner housing telescopically engaged within the outer housing, a biasing member coupled with the outer housing and operative to counter-balance the inner housing within the outer housing, and a locking mechanism for locking the position of the inner housing relative to the outer housing.

The locking mechanism may comprise a first locking vane and a second locking vane, each locking vane having a sloped surface abutting an edge of the inner housing and a second surface abutting an interior surface of the outer housing, wherein the sloped surfaces may initiate spreading of the locking vanes when the locking vanes are pulled into an extended position by the locking mechanism such that the second surfaces engage the interior surface of the outer housing with sufficient force to prevent movement of the inner housing relative to the outer housing.

The locking vanes may further comprise overlapping apertures and the display arm may further comprise a locking rod extending through the overlapping apertures at a first end while being engaged with the locking mechanism at a second end to actuate the locking vanes upon manipulation of the locking mechanism.

The display arm may be adapted to be mounted in a vertical orientation such that the outer housing includes a vertically oriented longitudinal axis.

The inner housing may be adjusted relative to the outer housing in an infinite number of positions between a greatest length, when the inner housing is extended a maximum distance from within the outer housing, and a minimum length, when the inner housing is extended a minimum distance from within the outer housing.

The locking mechanism may further comprise a locking handle adapted to pull the locking vanes into the extended position upon actuation of the locking handle about a locking handle pivot point into a first position.

The locking mechanism may further comprise a locking handle adapted to push the locking vanes from the extended position upon actuation of the locking handle about the locking handle pivot point into a second position.

The locking mechanism may further comprise a locking rod linking the locking handle to the locking vanes from a locking rod connection point on the locking handle to overlapping apertures provided through the locking vanes and a spring connection rod linking the locking handle to the spring from a spring rod connection point on the locking handle to the spring.

The locking rod connection point and the spring rod connection point of the locking handle may be arranged such that the locking rod connection point and the spring connection point revolve about the locking handle pivot point.

The revolving of the locking rod connection point and the spring rod connection point of the locking handle about the locking handle pivot point may be permitted through a range of approximately 90°.

The outer housing and the inner housing may be spaced apart from one another by a fixed bushing and a sliding bushing.

The outer housing and the inner housing may be cylindrical.

The adjustable display arm may further comprise a mounting mechanism attached to the outer housing for mounting the adjustable display arm to a fixed object.

The adjustable display arm may further comprise an attachment block extending from the inner housing for attaching the device to be displayed to the adjustable display arm.

The biasing member may be a constant force spring.

The constant force spring may have a spring force of sufficient magnitude to support the inner housing and the device to be displayed.

In accordance other aspects of the present invention, an adjustable display arm for positioning a device in a plurality of vertical positions may comprise an elongated outer housing, an elongated inner housing having portions telescopically engaged within the outer housing, a biasing spring coupled with the outer housing for supporting the inner housing within the outer housing, and a locking mechanism for locking the position of the inner housing relative to the outer housing, the locking mechanism comprising a lever rotatably engaged to the outer housing and a pair of locking vanes within the outer housing, wherein actuation of the lever forces the locking vanes against an inner surface of the outer housing inhibiting movement of the inner housing relative to the outer housing by frictional forces between the locking vanes and the inner surface of the outer housing.

The inner housing may be locked relative to the outer housing in any of an infinite number of positions.

In accordance with further aspects of the present invention, an adjustable display arm for positioning a device in a plurality of positions may comprise an elongated outer housing, an elongated inner housing telescopically engaged within the outer housing, a biasing member coupled with the outer housing and operative to counter-balance the inner housing within the outer housing, and means for locking the position of the inner housing relative to the outer housing.

In accordance with still further aspects of the present invention, a method of positioning a display device utilizing an adjustable display arm having an inner housing telescopically engaged within an outer housing, wherein the inner housing may be locked relative to the outer housing by manipulation of a locking mechanism between a first position and a second position to apply friction between a pair of locking vanes associated with the inner housing and the outer housing, may comprise adjusting the position of the inner housing relative to the outer housing and locking the inner housing relative to the outer housing my moving a locking mechanism from a first position to a second position to apply friction between a pair of locking vanes associated with the inner housing and the outer housing.

The method of positioning a display device may further comprise the step of returning the locking mechanism to the first position to remove friction between the pair of locking vanes associated with the inner housing and the outer housing.

BRIEF DESCRIPTION OF THE DRAWINGS

The above description, as well as further objects, features and advantages of the present invention will be more fully understood with reference to the following detailed description of an adjustable display arm for electronic components, when taken in conjunction with the accompanying drawings.

DETAILED DESCRIPTION OF THE PREFERRED EMBODIMENTS

In describing the preferred embodiments of the subject matter illustrated and to be described with respect to the drawings, specific terminology will be resorted to for the sake of clarity. However, the invention is not intended to be limited to the specific terms so selected and is to be understood that each specific term includes all technical equivalents which operate in a similar manner to accomplish a similar purpose.

The display arm of the present invention is well suited for supporting devices, particularly electronic components such as CRT screens, LCD screens, or plasma displays, keyboards or television sets. The display arm is ideal for mounting at an elevated location so the supported device will not interfere with an below, such as a work area or an area where individuals may congregate. Once so supported, the display arm may be extended downward so the device may be accessed for hands-on operation or for easy viewing.

Notwithstanding the natural use with electronic components, the present invention is not intended to be so limited. Rather, any suitably sized device for which there is a need for a versatile and adjustable mounting system may be utilized in conjunction with the present invention. As will be discussed in greater detail, the invention incorporates elements capable of being modified or exchanged for use with mounted objects of varying sizes, configurations and weights, as the need arises.

The display arm of the present invention is generally constructed to be extendable in a telescopic manner to provide variable height adjustment for a supported device. The supported device may therefore be positioned vertically at different elevations, depending upon the needs of the particular user or users. This ability to position the supported device at different elevations is based upon the telescopic nature of the display arm, in general, and upon the inner housing being freely adjustable within the outer housing in particular.

Figure 1:
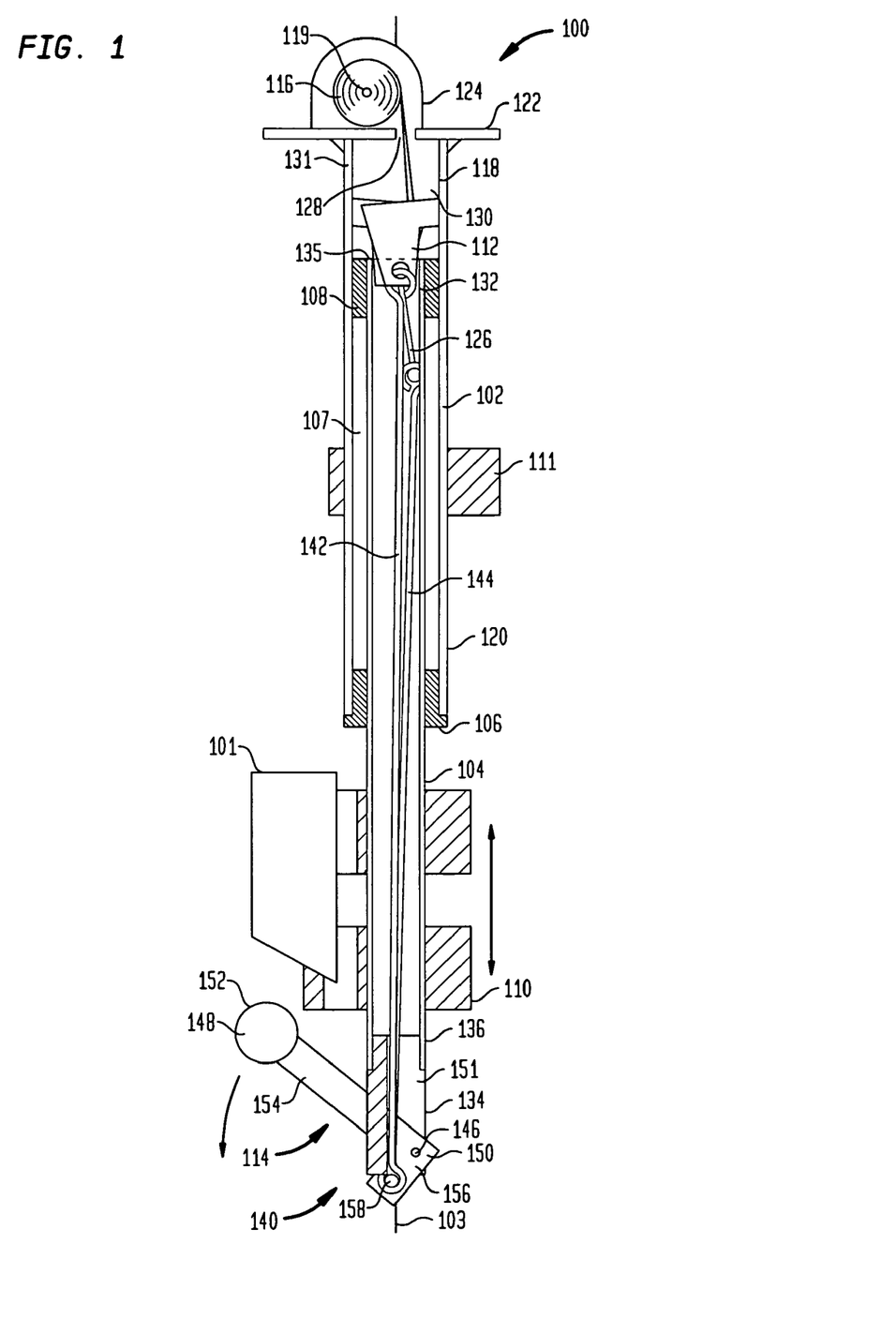
FIG. 1 depicts a cross-sectional view of the display arm of the present invention.

With reference to FIG. 1, a cross-sectional view of the preferred embodiment of the present invention, the display arm 100 generally comprises an outer housing 102 with an inner housing 104 slideably engaged therein. The outer housing 102 is preferably offset from the inner housing 104 by both a fixed bushing 106 and a sliding bushing 108, leaving a voided area 107 therebetween. Sliding of the inner housing 104 relative to the outer housing 102 therefore alters the display height of a device 101 attached to the inner housing by attachment blocks 110. Once slid into the preferred position, the inner housing 104 may be temporarily locked by actuation of locking vanes 112 via locking handle 114 and its associated locking system 140. To assist with adjustment of the device 101 height, the weight of the inner housing 104 and the device may be biased by a constant force spring 116 mounted to the outer housing 102 and connected to elements of the inner housing 104 to provide an uplifting force on the inner housing.

This counter-balancing spring 116 is preferably in the nature of a Negator spring which is well known in the art and available from a number of commercial sources. The Negator spring 116 is generally a coiled flat spring supported about a shaft 119 as shown in FIG. 1. The size and counterbalancing effect of the spring 116 may be varied depending upon the nature of the display arm 100 and the weight of the device 101 to be supported. The particular selection and technical requirements for the spring 116 are known to those skilled in the art. It will be appreciated that any number of Negator springs 116 may be utilized for counterbalancing the weight of the telescoping components of the display arm 100 and supported device 101. For example, in accordance with other embodiments of the present invention, two or more Negator springs may be utilized in conjunction with a single display arm 100.

Outer housing 102 is preferably an elongated cylindrical body having a first end 118 and a second end 120. Each of the two ends 118, 120 are opposed along the longitudinal axis 103 of the outer housing 102. Preferably mounted at the first end 118 is a support flange 122. The support flange 122 may act as a base upon which the constant force spring 116 may be mounted. A cover 124 may be provided to protect the spring 116 and to improve the aesthetics of the display arm 100.

An end portion 126 of the spring 116 may be permitted to pass through an aperture 128 provided in the support flange 122. The aperture 128 opens from within the spring cover 124, if so provided, into an interior section 130 of outer housing 102. Extending through the aperture 128, the end portion of the spring 126 may attach to a spring connecting rod 144, as will be discussed in greater detail below.

As with outer housing 102, inner housing 104 is also preferably cylindrical in shape, and is preferably of a smaller diameter than outer housing 102 so it may fit therein in a telescopic arrangement. Inner housing 104 may comprise a first end 132 slidingly engaged within outer housing 102, and a second end 134 extending from within the outer housing at the second end 120 of the outer housing. As previously discussed, inner housing 104 may be offset from outer housing 102 by a fixed bushing 106 mounted at the second end 120 of outer housing 102 and a sliding bushing 108 mounted at the first end 118 of the outer housing. It will be appreciated that the fixed bushing 106 may be permanently affixed to the outer housing 102 while the sliding bushing 108 is preferably attached to the inner housing 104. The attachment of the bushings 106, 108 to the respective housings 102, 104 may be through chemical means such as adhesives, or through mechanical means such as riveting. The sliding bushing 108 preferably slides along the interior surface 131 of the outer housing 102 into the voided area 107 between the two housings upon movement of the inner housing 104 relative to the outer housing. It will be appreciated that when the first end 132 of the inner housing is closest to the first end 118 of the outer housing 102, the voided area 107 is greatest. Conversely, when the first end 132 of the inner housing is closest to the second end 120 of the outer housing 102, the voided area is minimized, and may be completely consumed by the sliding bushing 108 and the fixed bushing 106.

Attached to the exterior surface 136 of the interior housing 104 are preferably a pair of display and accessory attachment blocks 110. The blocks 110 are typically mechanically attached to the outer housing 102, such as through the use of rivets, bolts, or welds. The blocks may also be chemically bonded, for example with adhesives. The blocks 110 provide attachment points for connecting and displaying the device 101. Blocks 110 of this type are generally well known in the art, and may range from simple brackets to more intricate castings custom made for each individual application. As the blocks 110 are preferably fixed to the inner housing 104, it will be apparent that the position of the blocks 110 is dependent on the position of the inner housing relative to the outer housing 102.

The outer housing 102 may also include an attachment mechanism 111 for attaching the display arm 100 to a fixed support, such as a wall or ceiling. Typically, the attachment mechanism 111 is mechanically attached to the outer housing 102. The mechanism may be a universal-type mount, or may be custom manufactured for the specific application. In any event, this attachment mechanism 111 is preferably designed to support the weight of the display arm 100 as well as the intended component 101 to be displayed, with an appropriate safety factor built in. It will be appreciated that the design criteria may incorporate live loads as well as dead loads, due to the movement capabilities of the display arm 100 particularly with respect to the inner housing 104 relative to the outer housing 102. Suitable attachment mechanisms 111 are well known in the industry.

Attached to the second end 134 of the inner housing 104 may be a locking handle 114. This handle 114 may be utilized to selectively restrict or permit sliding of the inner housing 104 relative to the outer housing 102 by utilizing frictional forces generated between the locking vanes 112 and the inner surface 131 of outer housing 102 when the locking handle 114 is operated. The locking handle 114 forms a portion of a locking system 140 working in concert with the counterbalancing effects of the constant force spring 116. In addition to the locking handle 114, the locking system may include a locking rod 142 and the locking vanes 112. Generally, the locking system 140 is utilized to selectively restrict or permit sliding of the inner housing 104 relative to the outer housing 102 by utilizing frictional forces generated between the locking vanes 112 and the inner surface 131 of outer housing 102 when the locking handle 114 is operated.

The locking handle 114 preferably comprises a grasping portion 148 at its proximal end 152 and a connecting plate 156 at its distal end 150. The grasping portion 148 is intended to be a comfortable area for the user to grasp, such as a shaped handle. Between the grasping portion 148 and the connecting plate 156 is preferably an elongated lever portion 154, the length of which helps to determine the amount of leverage available on the system for a given force applied to the grasping portion 148.

The second end 134 of the inner housing 104 may include a support plate 151 mounted along the longitudinal axis 103 of the outer housing 102 and parallel to the length of the locking handle 114. The connecting plate 156 is preferably attached to the support plate 151 by a handle pivot pin 146. The entire handle assembly 114, including the grasping portion 148, the lever portion 154 and the connecting plate 156 may rotate about pin 146 when the lever portion is operated.

A rod pin 158 may connect the connecting plate 156 to both the locking rod 142 and the spring connecting rod 144, at a single attachment point. The two pins 146, 158 may be mounted in an over-the-center-type arrangement, such that the rod pin 158 may revolve about the handle pivot pin 146 in a circular path such that the relative distance between the rod pin and the handle pivot pin remains constant. As viewed in accordance with the cross-section shown in FIG. 1, it will therefore be appreciated that the relative distance of the rod pin 158 from the outer housing 102. Preferably, such revolution is only permitted through a range of approximately 90°. Of note, this arrangement permits the permits the handle assembly 114 to provide tension on the locking rod 142 and connecting rod 144 to selectively pull the locking vanes 112 toward the locking system 140 when the handle 114 is lowered and compression to push the locking vanes 112 away from the locking system when the handle is raised.

As stated, both the spring connecting rod 144 and the locking rod 142 are connected to the rod pin 158 at the second end 134 of the inner housing 104. The spring connecting rod 144 is also attached to the constant force spring 116 near the first end 132 of the inner housing 104 at the spring connecting rod's opposite end. This connection helps to support the displayed device 101 by virtue of the spring 116 pulling the inner housing 104 upward. The constant force spring 116 may be sized to have a length and spring rate appropriate for the specified length of travel of the inner housing 104 and the weight of the inner housing and the displayed device 101. It will be appreciated that the spring rate is preferably sufficient to assist with the raising of the displayed object 101, without being so strong as to raise the object on its own or too weak to provide any real assistance. Ideally, the spring 116 is sized such that the weight of the displayed object 101 will be perfectly balanced against the force of the spring, such that the displayed object will generally remain in a given position absent the influence of any external forces. As previously addressed, multiple springs 116 may be provided such that their combined forces may act together.

Figure 2A:
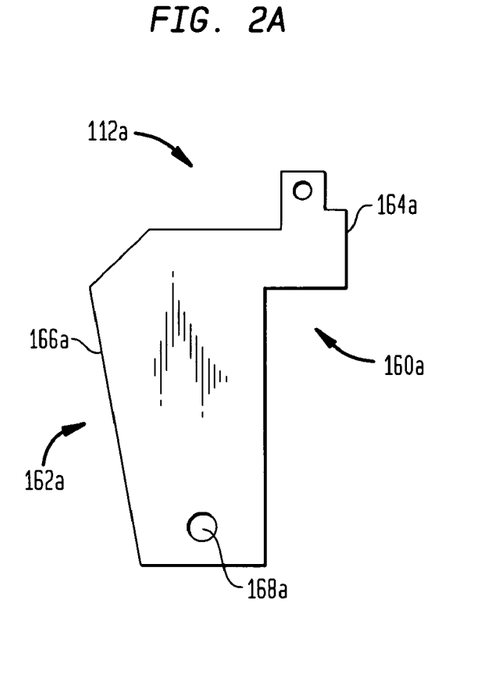
FIGS. 2a and 2b depict exploded plan views of the locking vanes forming a part of the invention.
Figure 2B:
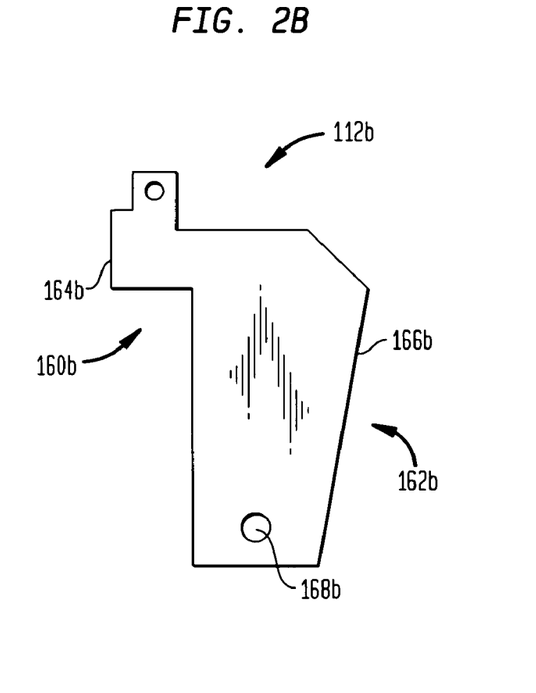

In addition to being attached to the rod pin 158, the locking rod may also be attached to the locking vanes 112, at its opposite end. The locking vanes 112a, 112b, are shown more clearly in the exploded views shown in FIGS. 2a and 2b. Each of the locking vanes 112a, 112b comprises a first section 160a, 160b and a second section 162a, 162b. The first section 160a, 160b of each locking vane 112a, 112b may be mounted in proximity to the interior surface 131 of the outer housing 102 near the first end 118. Each includes a bearing surface 164a, 164b which bears against the interior surface 131 of the outer housing 102 when the inner housing 104 is locked in position. The second section of each locking vane 162a, 162b extends toward the second end 134 of the inner housing 104 and includes an angled bearing surface 166a, 166b which may bear against the edge 135 of the inner housing 104 at its second end 134. Each of the locking vanes 112a, 112b also preferably includes an aperture 168a, 168b within the second section 162a, 162b.

Figure 3A:
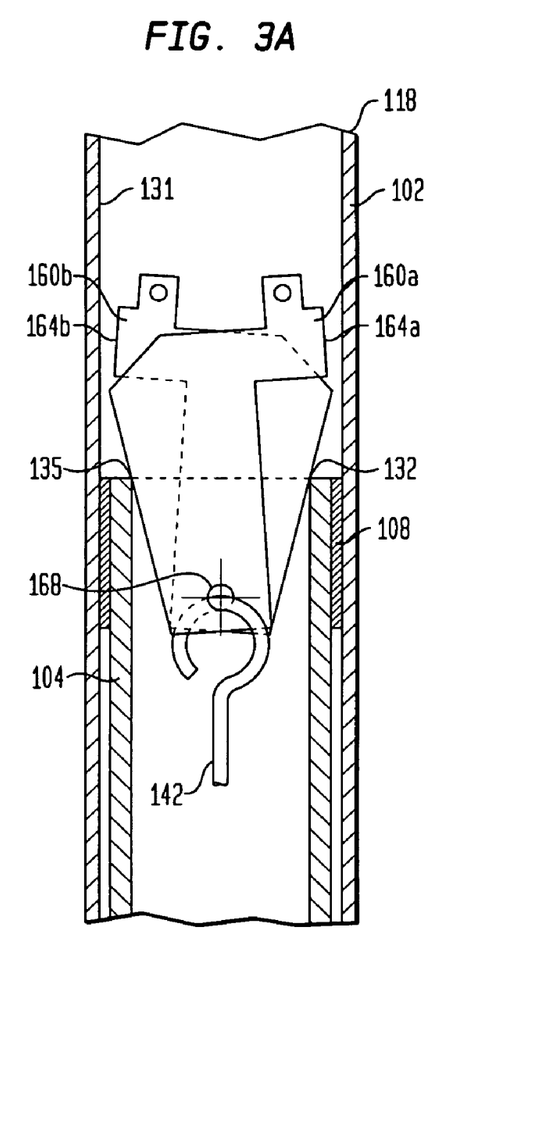
FIGS. 3a and 3b depict two cross-sectional views of a portion of the display arm of FIG. 1, showing the operation of the locking vanes; and, FIGS. 4a and 4b depict the cross-sectional views of the display arm depicted in FIGS. 3a and 3B, with one locking vane highlighted for clarification.
Figure 3B:
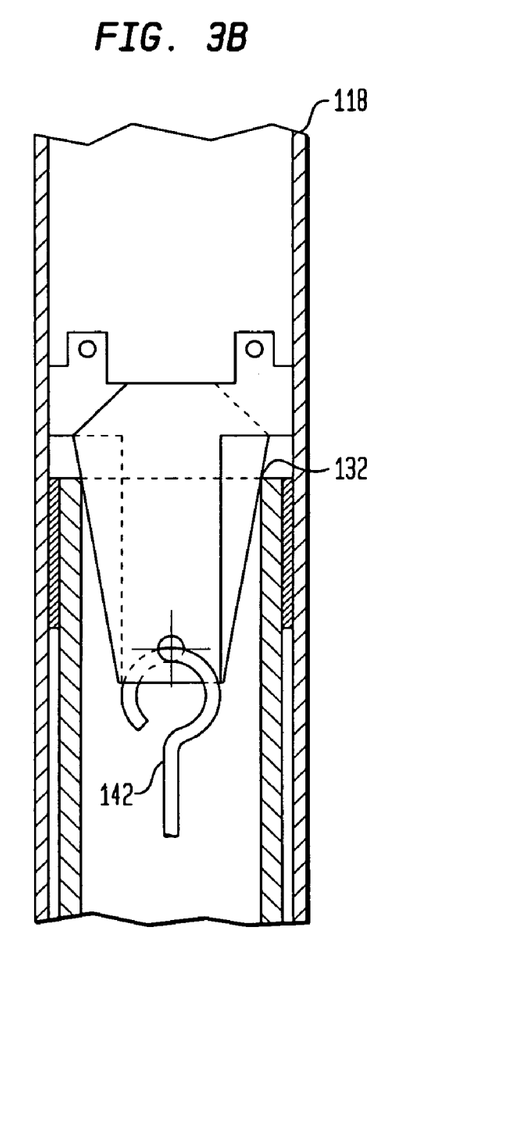

FIGS. 3a and 3b detail the method of locking the locking vanes 112. FIG. 3a depicts the locking vanes 112 in the unlocked position. As is shown and previously discussed, inner housing 104 is mounted within outer housing 102 with sliding bushing 108 and fixed bushing 106 therebetween. The locking vanes 112 are positioned within the housings 102, 104 and overlie each other such that their respective apertures 168a, 168b align, and their bearing surfaces 164a, 164b face away from each other toward the interior surface 131 of the outer housing 102. Locking rod 142 preferably extends through the apertures 168 a, 168b to connect the locking system 140 (FIG. 1) to the locking vanes 112. When the locking handle 114 (FIG. 1) is in the unlocked position, the locking rod 142 will preferably raise to push the locking vanes 112a, 112b toward the first end 118 of the outer housing. As shown in FIG. 3a, in this position the bearing surfaces 164a, 164b are either not in contact with the interior surface 131 outer housing 102, or just slightly in contact. Either way, there is little or no friction between the bearing surfaces 164a, 164b and the interior surface 131 of the outer housing 102, such that the inner housing 104 is free to slide within the outer housing.

Meanwhile, as shown in FIG. 3b, when the locking rod 142 is lowered such as when the locking handle 114 (FIG. 1) is moved downward toward the locked position, the locking vanes 112 will be pulled by the locking rod. This downward movement causes each angled bearing surface 166a, 166b to contact the edge 135 at the extreme first end 132 of the inner housing 104. Because of the incline of the angled bearing surfaces 166a, 166b, the first sections 160a, 160b of the locking vanes 112a, 112b are pushed outward toward the outer housing 102. The further the handle 114 is moved downward of the locking vanes 112a, 112b, the further the first portions 160a, 160b are pushed outward. Eventually, the bearing surfaces 164a, 164b will contact the interior surface 131 of the outer housing 102 and develop enough friction to prevent the inside housing 104 from sliding further within the outer housing 102. At this point, the displayed object is locked into position as releasing the handle 114 will not effect any movement of the inner housing 104 relative to the outer housing 102. It will be appreciated that because of this novel locking system, the displayed object may be positioned at any height between the highest and lowest position of the display arm, and not merely at fixed predetermined intervals.

In this regard, lack of movement downward is self-evident, the bearing surfaces 164a, 164b cause sufficient friction to prevent such movement. Movement of the inner housing 104 relative to the outer housing 102 in the upward direction is preferably not a concern as the spring rate of the constant force spring 116 is preferably not great enough to overcome the weight of the display device 101 and the inner housing 104, and the friction of the bearing surfaces 164a, 164b.

Figure 4A:
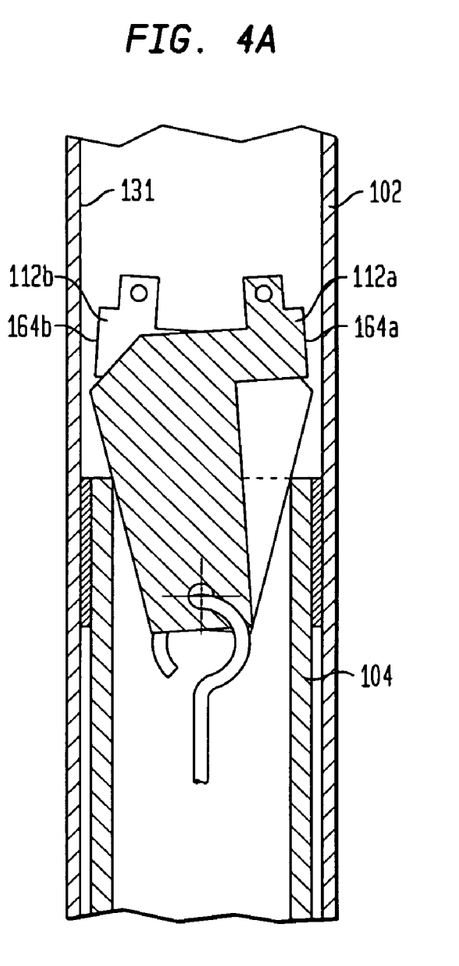
Figure 4B:
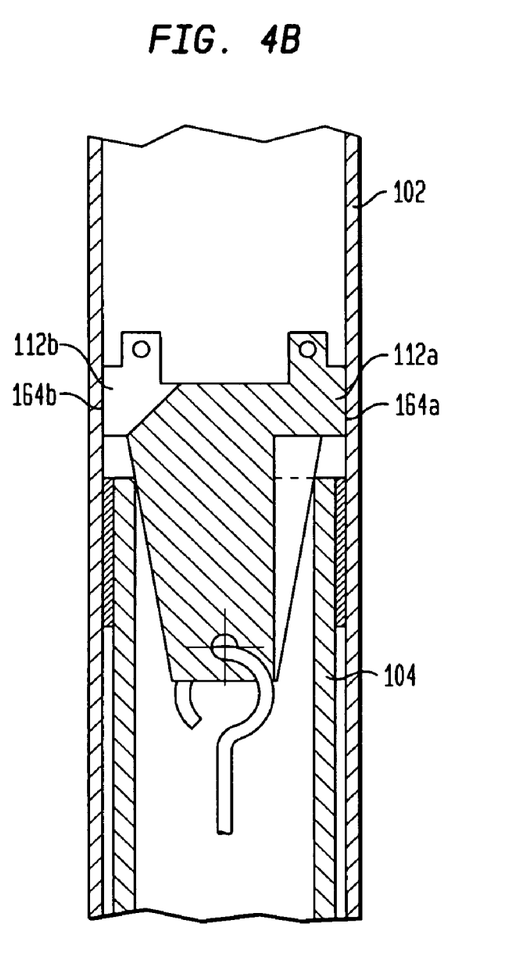

To better appreciate the operation of the locking vanes 112a 112b, FIGS. 4a and 4b are provided. FIGS. 4a and 4b each depict locking vane 112a shaded or otherwise highlighted for clarification. Locking vane 112b remains unshaded and is positioned behind locking vane 112a. As shown in the figures and previously discussed in greater detail, downward movement of the locking vanes 112a, 112b causes the bearing surfaces 164a, 164b to increasingly bear with greater force against the inner surface 131 of outside housing 102, such as when the locking vanes are moved downward from the position shown in FIG. 4a to that shown in FIG. 4b.

Although many different materials may be used to construct the adjustable display arm 100 described herein, certain materials have been found to be preferable. For example, aluminum is preferable for both the inner and outer housings 102, 104. Aluminum is preferable for many reasons, including its high strength to weight ratio, excellent finished properties, and low cost. The locking vanes 112 are most advantageously formed from steel. Steel has the benefit of being highly durable and cost effective, without imparting too much of a weight penalty. The bushings 106, 108 are preferably formed from plastics or other low friction materials. Other materials which may be used in the manufacture of the display arm, for any of the components, include other metals such as brass or stainless steel, or various plastics.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An adjustable display arm for positioning a device in a plurality of positions, said display arm comprising an elongated outer housing; an elongated inner housing telescopically engaged within said outer housing; a biasing member coupled with said outer housing and operative to counter-balance said inner housing within said outer housing; and a locking mechanism for locking the position of said inner housing relative to said outer housing, wherein said locking mechanism comprises a first locking vane and a second locking vane, each locking vane having a sloped surface abutting an edge of said inner housing and a second surface abutting an interior surface of said outer housing; wherein said sloped surfaces initiate spreading of said locking vanes when said locking vanes are pulled into an extended position by said locking mechanism such that said second surfaces engage the interior surface of said outer housing with sufficient force to prevent movement of said inner housing relative to said outer housing.

2. The adjustable display arm of claim 1, further comprising an attachment block extending from said inner housing for attaching the device to be displayed to said adjustable display arm.

3. The adjustable display arm of claim 1, wherein said locking vanes further comprise overlapping apertures, said display arm further comprising a locking rod extending through said overlapping apertures at a first end and being engaged with said locking mechanism at a second end to actuate said locking vanes upon manipulation of said locking mechanism.

4. The adjustable display arm of claim 1, wherein said display arm is adapted to be mounted in a vertical orientation such that said outer housing includes a vertically oriented longitudinal axis.

5. The adjustable display arm of claim 4, wherein said inner housing may be adjusted relative to said outer housing in an infinite number of positions between a greatest length, when said inner housing is extended a maximum distance from within said outer housing, and a minimum length, when said inner housing is extended a minimum distance from within said outer housing.

6. The adjustable display arm of claim 4, wherein said locking mechanism further comprises a locking handle adapted to pull said locking vanes into said extended position upon actuation of said locking handle about a locking handle pivot point into a first position.

7. The adjustable display arm of claim 6, wherein said locking mechanism further comprises a locking rod linking said locking handle to said locking vanes from a locking rod connection point on said locking handle to overlapping apertures provided through said locking vanes and a spring connection rod linking said locking handle to said spring from a spring rod connection point on said locking handle to said spring.

8. The adjustable display arm of claim 7, wherein said locking rod connection point and said spring rod connection point of said locking handle are arranged such that said locking rod connection point and said spring connection point revolve about said locking handle pivot point.

9. The adjustable display arm of claim 8, wherein the revolving of said locking rod connection point and said spring rod connection point of said locking handle about said locking handle pivot point is permitted through a range of approximately 90°.

10. The adjustable display arm of claim 4, wherein said locking mechanism further comprises a locking handle adapted to push said locking vanes from said extended position upon actuation of said locking handle about the locking handle pivot point into a second position.

11. The adjustable display arm of claim 1, wherein said outer housing and said inner housing are spaced apart from one another by a fixed bushing and a sliding bushing.

12. The adjustable display arm of claim 1, wherein said outer housing and said inner housing are cylindrical.

13. The adjustable display arm of claim 1, further comprising a mounting mechanism attached to said outer housing for mounting said adjustable display arm to a fixed object.

14. The adjustable display arm of claim 1, wherein said biasing member is a constant force spring.

15. The adjustable display arm of claim 14, wherein said constant force spring has a spring force of sufficient magnitude to support said inner housing and the device to be displayed.

16. An adjustable display arm for positioning a device in a plurality of positions, said display arm comprising an elongated outer housing; an elongated inner housing telescopically engaged within said outer housing; a biasing member coupled with said outer housing and operative to counter-balance said inner housing within said outer housing; and means for locking the position of said inner housing relative to said outer housing, wherein said biasing mechanism includes a first locking vane and a second locking vane, each locking vane having a sloped surface abutting an edge of said inner housing and a second surface abutting an interior surface of said outer housing; wherein said sloped surfaces initiate spreading of said locking vanes when said locking vanes are pulled into an extended position by said means for locking such that said second surfaces engage the interior surface of said outer housing with sufficient force to prevent movement of said inner housing relative to said outer housing.

17. An adjustable display arm for positioning a device in a plurality of vertical positions, said display arm comprising:
   an elongated outer housing;
   an elongated inner housing having portions telescopically engaged within said outer housing;
   a biasing spring coupled with said outer housing for supporting said inner housing within said outer housing; and,
   a locking mechanism for locking the position of said inner housing relative to said outer housing, said locking mechanism comprising a lever rotatably engaged to said outer housing and a pair of locking vanes within said outer housing;
   wherein actuation of said lever forces said locking vanes against an inner surface of said outer housing inhibiting movement of said inner housing relative to said outer housing by frictional forces between said locking vanes and said inner surface of said outer housing.

18. The adjustable display arm of claim 17, wherein said inner housing may be locked relative to said outer housing in any of an infinite number of positions.

19. A method of positioning a display device utilizing an adjustable display arm having an inner housing telescopically engaged within an outer housing, wherein the inner housing may be locked relative to the outer housing by manipulation of a locking mechanism between a first position and a second position to apply friction between a pair of locking vanes associated with the inner housing and the outer housing, said method comprising the steps of:

adjusting the position of the inner housing relative to the outer housing;

locking the inner housing relative to the outer housing my moving a locking mechanism from a first position to a second position to apply friction between a pair of locking vanes associated with the inner housing and the outer housing.

20. The method of positioning a display device of claim 19, further comprising the step of returning the locking mechanism to the first position to remove friction between the pair of locking vanes associated with the inner housing and the outer housing.

* * * * *

UNITED STATES PATENT AND TRADEMARK OFFICE
CERTIFICATE OF CORRECTION

| | |
|---|---|
| PATENT NO. | : 7,222,831 B2 |
| APPLICATION NO. | : 10/892798 |
| DATED | : May 29, 2007 |
| INVENTOR(S) | : Odd N. Oddsen, Jr. and Howard M. Williams, Jr. |

It is certified that error appears in the above-identified patent and that said Letters Patent is hereby corrected as shown below:

Col. 4, Line 24, "with an below," should read --with anything below,--.
Col. 6, Line 66, "permits the permits the" should read --permits the--.
Col. 8, Line 25, "evident, the" should read --evident, as the--.
Col. 11, Line 3, "outer housing my" should read --outer housing by--.

Signed and Sealed this

Tenth Day of June, 2008

JON W. DUDAS
*Director of the United States Patent and Trademark Office*